(12) United States Patent
Turner

(10) Patent No.: US 9,414,577 B2
(45) Date of Patent: Aug. 16, 2016

(54) WILDLIFE CAPTURING DEVICE

(71) Applicant: David Turner, Mt. Olive, NC (US)

(72) Inventor: David Turner, Mt. Olive, NC (US)

( * ) Notice: Subject to any disclaimer, the term of this patent is extended or adjusted under 35 U.S.C. 154(b) by 630 days.

(21) Appl. No.: 13/903,952

(22) Filed: May 28, 2013

(65) Prior Publication Data

US 2014/0352194 A1 Dec. 4, 2014

(51) Int. Cl.
*A01K 74/00* (2006.01)
*A01K 75/00* (2006.01)
*A01K 69/10* (2006.01)

(52) U.S. Cl.
CPC .................................... *A01K 74/00* (2013.01)

(58) Field of Classification Search
CPC ....... A01K 74/00; A01K 75/00; A01K 97/00; A01K 97/14; A01K 69/10; A01K 77/00; A01K 73/12; A01K 80/00; A01M 23/24; A01M 23/245; A01M 23/26; A01M 23/265; A01M 23/28; A01M 3/00; A01M 3/002
USPC ...................... 43/12, 133, 134, 135
See application file for complete search history.

(56) References Cited

U.S. PATENT DOCUMENTS

| | | | | |
|---|---|---|---|---|
| 1,403,171 A * | 1/1922 | Koenig | ................... | A01K 73/12 43/105 |
| 1,531,299 A * | 3/1925 | Merle, Sr. | .............. | A01K 69/06 43/105 |
| 1,710,569 A * | 4/1929 | Castorina | ............... | A01K 74/00 43/100 |
| 2,413,552 A * | 12/1946 | Ethridge | ................ | A01K 74/00 43/103 |
| 3,428,353 A * | 2/1969 | St. Jean | .................... | A01M 3/00 294/104 |
| 3,553,881 A * | 1/1971 | Hasseman | .............. | A01K 69/06 43/105 |
| 4,141,172 A * | 2/1979 | Prosol | .................... | A01K 69/06 43/105 |
| 4,182,068 A * | 1/1980 | Iannucci | .............. | A01K 97/045 248/505 |
| 4,365,575 A * | 12/1982 | Cicero | ................... | A01K 74/00 114/255 |
| 4,554,760 A * | 11/1985 | Ponzo | .................... | A01K 69/06 43/100 |
| 4,653,214 A * | 3/1987 | Cline | ..................... | A01K 77/00 43/11 |
| 4,654,997 A * | 4/1987 | Ponzo | .................... | A01K 69/10 43/102 |
| 4,765,088 A * | 8/1988 | Stuart | .................... | A01K 69/10 43/100 |
| 4,821,451 A * | 4/1989 | Matson | .................. | A01K 69/06 43/102 |
| 4,850,133 A * | 7/1989 | Burzdak | ................. | A01M 3/00 294/104 |
| 5,207,017 A * | 5/1993 | Litrico | ................... | A01K 69/10 43/100 |
| 5,353,541 A * | 10/1994 | Jonason | ................. | A01K 69/10 43/100 |
| 5,615,510 A * | 4/1997 | Anderson | ............. | A01K 74/00 43/12 |
| 6,065,239 A * | 5/2000 | Thomas | ................. | A01K 74/00 43/14 |
| 6,067,942 A * | 5/2000 | Fernandez | .......... | A01K 15/003 119/802 |
| 6,247,264 B1 * | 6/2001 | Prosol | .................... | A01K 69/06 43/100 |
| 2003/0000125 A1* | 1/2003 | Wellard | ................ | A01K 77/00 43/12 |
| 2004/0163302 A1* | 8/2004 | Hong | ..................... | A01K 69/10 43/105 |

FOREIGN PATENT DOCUMENTS

| | | | | |
|---|---|---|---|---|
| CN | 201036397 Y | * | 4/2007 | ............. A01K 77/00 |
| NO | WO 2009145639 A1 | * | 12/2009 | ............. A01K 69/10 |

* cited by examiner

*Primary Examiner* — Christopher P Ellis
*Assistant Examiner* — Michael Wang
(74) *Attorney, Agent, or Firm* — Olive Law Group, PLLC

(57) ABSTRACT

A fish capturing device is provided. The device includes a pair of cage members having a first position in which an opening is defined therebetween through which a fish may be passed and a second position in which each of the cage members are pivoted until the cage members are nested together to form an enclosure for enclosing a fish therein. A latch is configured for latching the pair of cage members into the first position and releasing the pair of cage members into the second position. A tensioner applies tension to the pair of cage members to bias the cage members into the second position to enclose the fish within the pair of cages.

15 Claims, 5 Drawing Sheets

WILDLIFE CAPTURING DEVICE

TECHNICAL FIELD

This disclosure is related to a wildlife capturing device, and, more particularly, towards a wildlife capturing device suitable for capturing aquatic life without inflicting harm unto the captured aquatic life.

BACKGROUND

Many methods exist for capturing aquatic animals such as fish. For example, traditional methods include using a line and baited hook, a net, and a gig. A gig usually includes a pole or other elongate item suitable for being grasped and a speared end at which a fish is speared. Spearing a fish is generally considered acceptable when the fish is going to be kept for nutrition or gaming purposes, however, in some instances a fisherman may spear a fish that they cannot otherwise keep.

For example, some municipalities and/or governments have restrictions on the size of a fish that may be harvested such as, for example, a minimum length of a fish. This presents problems when using a gig as a gigged fish is unlikely to recover from the injuries sustained during gigging. For a gigged fish that is under the minimum length requirements, the fisherman must release the gigged fish back into the water. Gigging an undersized fish may happen often when judging the length of a fish during poor visibility due to lack of lighting for fishing at night, water with low visibility, and depth perception due to refracted optics in water. Unfortunately, due to the injuries sustained by the gigged fish, it is likely that an undersized, gigged fish will not survive the injuries from gigging after being released.

A need therefore exists for a method or solution that addresses these disadvantages.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a fish capturing device. The device includes a pair of cage members having a first position in which an opening is defined therebetween through which a fish may be passed through. A latch is configured for latching the pair of cage members into the first position and releasing the pair of cage members in which the opening is closed therebetween and the pair of cage members is nested to form an enclosure in a second position. A tensioner applies tension to the pair of cage members to bias the cage members into the second position to enclose the fish within the pair of cages.

According to one or more embodiments, the device includes a brace extending lengthwise with each of the pair of cage members and pivotally carrying each cage member.

According to one or more embodiments, the cage has netting carried thereabout for forming the enclosure.

According to one or more embodiments, a length of one of the pair of cages is less than a length of the other of the pair of cages such that the shorter cage can be received within the longer cage when the pair of cages is in the second position.

According to one or more embodiments, the latch is carried by an elongate handle.

According to one or more embodiments, the elongate handle is configured to rotate the latch from the latched to an unlatched position.

According to one or more embodiments, the latch includes a rotatable bar that engages beneath a portion of each of the pair of cages to place the cages in the first position when the latch is in the latched position.

According to one or more embodiments, the tensioner includes one of a rope, string, and cable, and further wherein, pulling upwards on the tensioner at a portion proximal the elongate handle biases the cages into the second position.

According to one or more embodiments, each of the pair of cages includes a support extending therefrom. Each of the supports surrounds the handle and is pivoted when the pair of cages moves between the first and second positions.

According to one or more embodiments, the supports can be grabbed and pivoted until in parallel alignment to impart movement of the pair of cages into the first position.

According to one or more embodiments, the supports surround the elongate handle so as to maintain the elongate handle in a generally upright orientation when the pair of cages are in the first position and the device is resting about the opening on a ground surface.

According to one or more embodiments, a fish capturing device is provided. The device includes a pair of cage members having a first position in which an opening is defined therebetween through which a fish may be passed and a second position in which each of the cage members are pivoted until the cage members are nested together to form an enclosure for enclosing a fish therein. A latch is configured for latching the pair of cage members into the first position and releasing the pair of cage members into the second position. A tensioner applies tension to the pair of cage members to bias the cage members into the second position to enclose the fish within the pair of cages.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
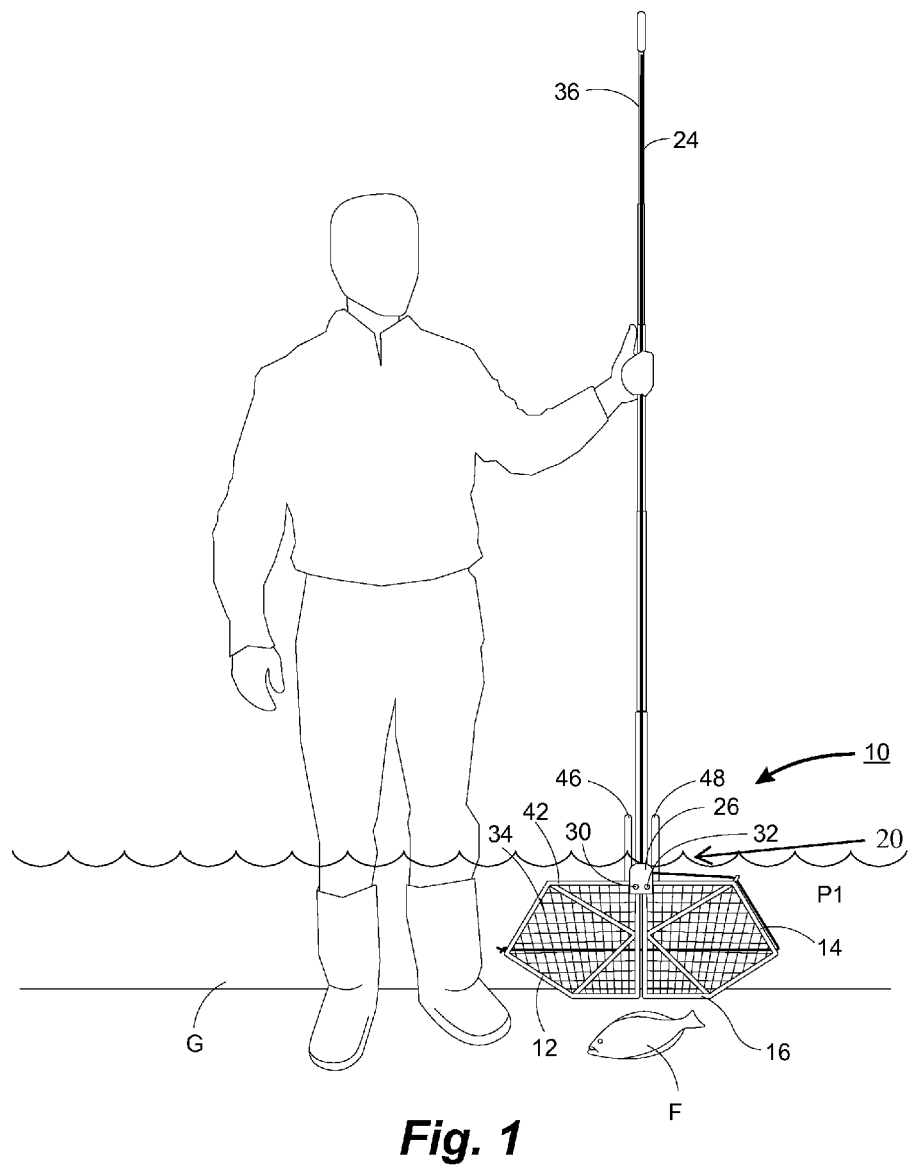
FIG. 1 illustrates a fisherman and a fish capturing device in a first position P1 according to one or more embodiments disclosed herein.
Figure 2:
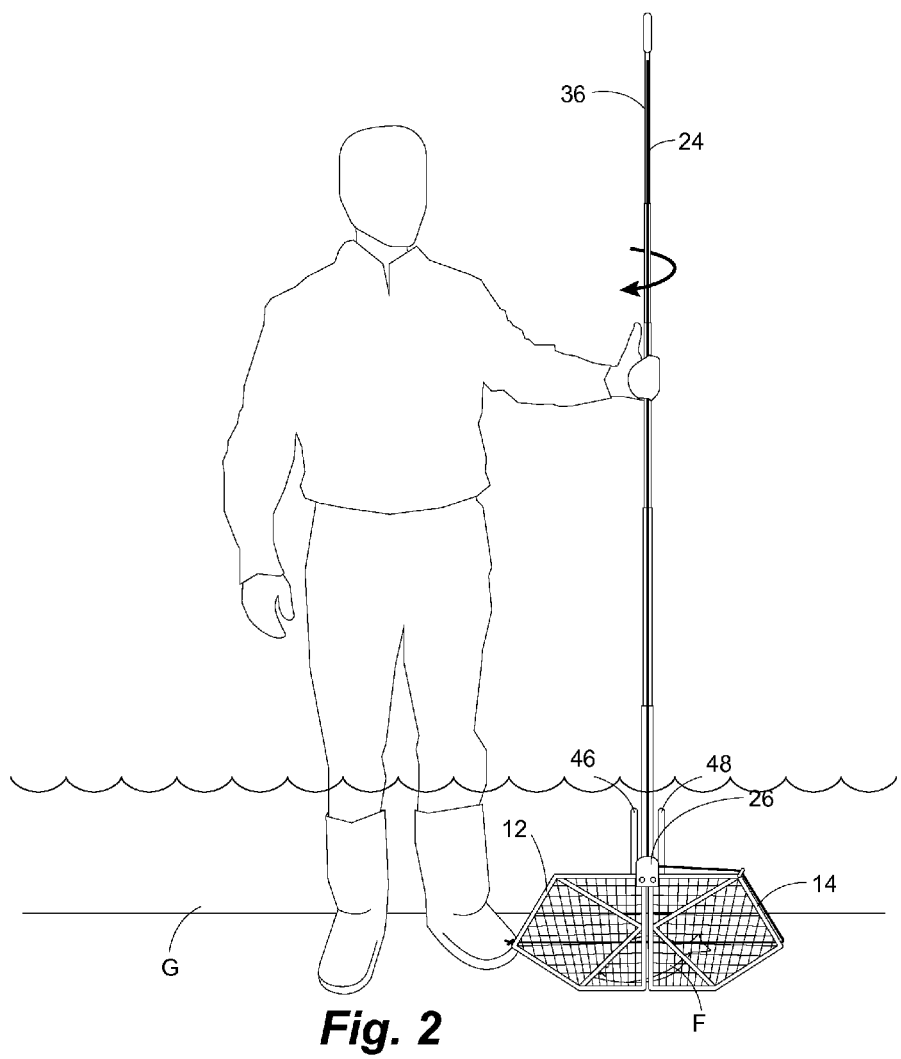
FIG. 2 illustrates a fisherman and a fish capturing device in which a fish is captured within an enclosure formed in the fish capturing device according to one or more embodiments disclosed herein.

FIG. 1 illustrates a fisherman using a device generally designated 10 according to one or more embodiments disclosed herein. The device 10 is provided for capturing fish or other animals and aquatic life. The device 10 is illustrated in a first position (P1) in FIG. 1 and positioned above a fish "F" that is resting against a ground surface "G." The device 10 is illustrated in a second position (P2) in FIG. 3 in which the fish is enclosed therein, and illustrated in transition between the first position (P1) and the second position (P2) in FIG. 2. In operation, the device is positioned proximal and over a fish "F" and then translated downwardly until the fish "F" is enclosed within the device 10 as illustrated in FIG. 2. The device 10 is then actuated into the second position (P2) in a manner that will be described in greater detail later.

Figure 3:
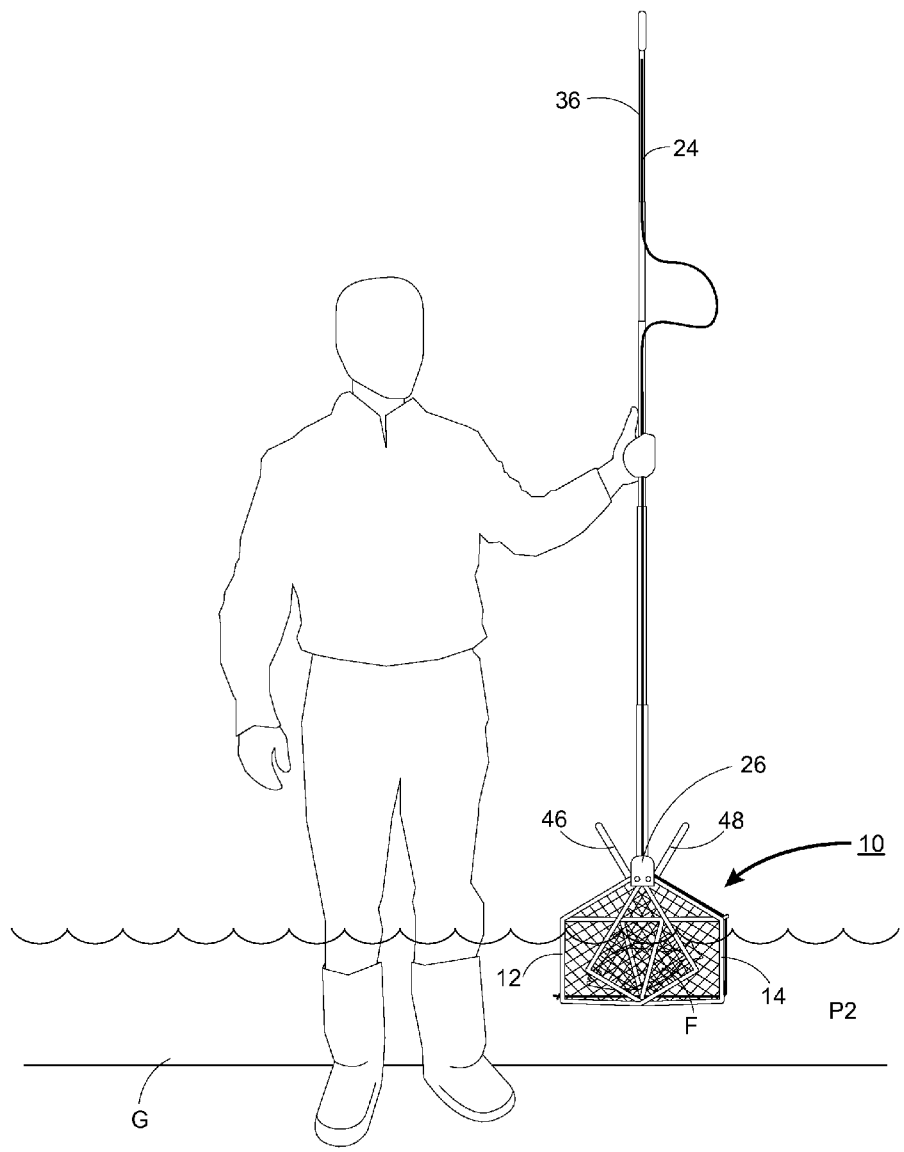
FIG. 3 illustrates a fisherman and a fish capturing device in a second position P2 in which a fish is captured within an enclosure formed in the fish capturing device and lifted upwards according to one or more embodiments disclosed herein.
Figure 4:
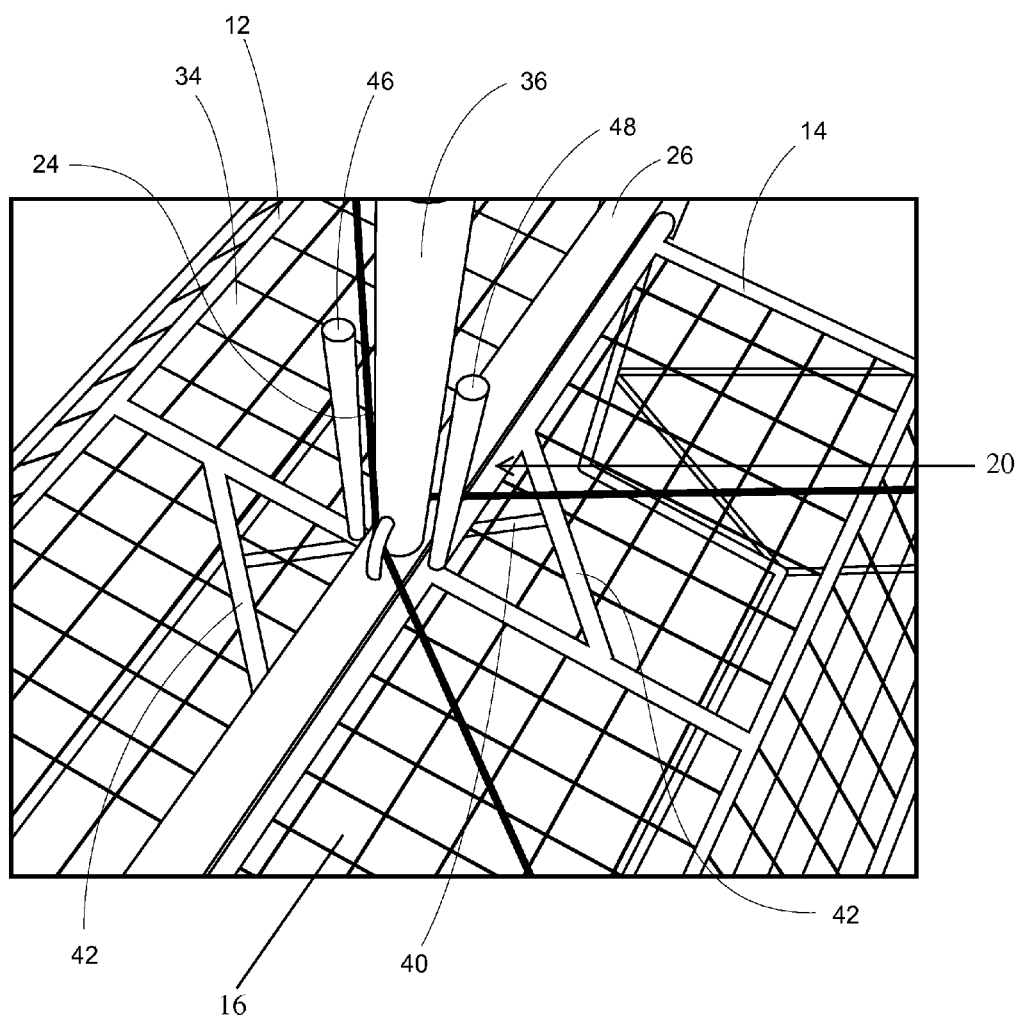
FIG. 4 illustrates a partial, top perspective view of a fish capturing device in a first position according to one or more embodiments disclosed herein.
Figure 5:
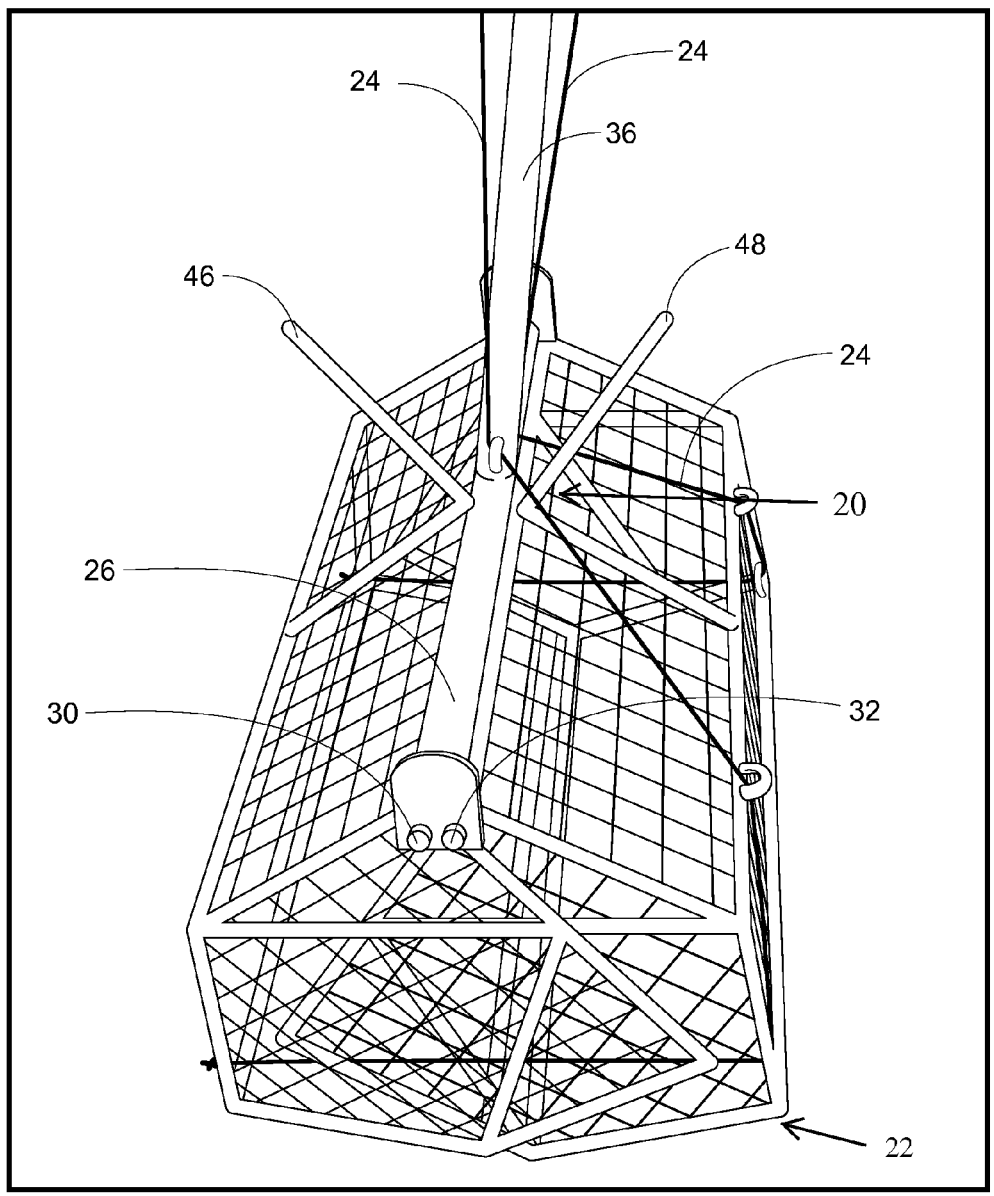
FIG. 5 illustrates a top perspective view of a fish capturing device in a second position according to one or more embodiments disclosed herein.

The device 10 is shown in greater detail in FIGS. 4 and 5. The fish capturing device 10 includes a pair of cage members, each identified as 12 and 14. The pair of cage members 12, 14 has a first position (P1) in which an opening 16 is defined therebetween through which a fish "F" may be passed through. A latch 20 is configured for latching the pair of cage members 12, 14 into the first position. The latch 20 is further configured for releasing the pair of cage members 12, 14 in which gravity and tension applied thereto transitions the cages 12, 14 into a second position in which the opening is closed therebetween and the pair of cage members 12, 14 are nested to form an enclosure 22. The latch 20 is carried by an elongate handle 36. A tensioner 24 is provided for applying tension to the pair of cage members 12, 14 to bias the cage members 12, 14 into the second position to enclose the fish "F" within the pair of cages 12, 14. The tensioner 24 is illustrated as a rope in the one or more embodiments illustrated herein. In operation, after the latch 20 is moved into a position that allows rotation of cages 12, 14, the rope is pulled upwardly (as identified with the slack in rope 24 in FIG. 3) in order to tension the cage members 12, 14 into the second position (P2). This may be accomplished in a variety of ways, including the rope orientation relative to cages 12, 14 as illustrated in the figures.

The device 10 may include a brace 26 extending lengthwise with each of the pair of cage members 12, 14. In one or more embodiments, each of the cage members 12, 14 are pivotally carried by the brace 26 such that the cages 12, 14 can be pivoted from the first position (P1) to the second position (P2). The cage has netting 34 carried thereabout for forming the enclosure 22 such that a captured fish cannot excape. The netting 34 may define a thread pattern such that adjacent threads are a predetermined distance apart to help with measuring a captured fish. In other words, the net spacing may be, for example, one inch between adjacent threads such that if a fisherman counted 15 strands along a length of a fish, the fisherman would know that the fish is approximately 15 inches long.

In one or more embodiments, a length of one of the pair of cages 12 is less than a length of the other of the pair of cages 14 such that the shorter cage 12 can be received within the longer cage 14 when the pair of cages is in the second position. This is illustrated in FIG. 5.

As illustrated with particular reference to FIG. 2, FIG. 4, and FIG. 5, the elongate handle 36 is configured to rotate the latch 20 from the latched position (P1) to an unlatched position (P2). The latch 20 may include a rotatable bar 40 that engages beneath a portion of each of the pair of cages 12, 14 to place the cages in the first position when the latch 20 is in the latched position. A support 42 may be provided about each cage 12, 14 to which the rotatable bar 40 selectively engages with. When the rotatable bar 40 is aligned with the brace 26, the bar 40 is not restricting pivoting movement of each of cages 12, 14.

The tensioner 24 may include one of a rope, string, and cable. Additionally, the tensioner could be a torsional spring or other biasing member for biasing the cages 12, 14 into one of the desired positions or a combination of any elements depicted or described herein. The tensioner 24 is configured such that pulling upwards on the tensioner 24 at a portion proximal the elongate handle 36 biases the cages 12, 14 into the second position (P2).

As illustrated throughout the figures, each of the pair of cages 12, 14 includes supports 46, 48, respectively, extending therefrom. The supports 46, 48 surround the handle 36 and are pivoted when the pair of cages 12, 14 move between the first position (P1) and second position (P2). In this manner, the supports 46, 48 as illustrated in FIG. 5 can be grabbed and pivoted towards each other until in parallel alignment to impart movement of the pair of cages 12, 14 back into the first position (P1). Additionally, the supports 46, 48 surround the elongate handle 36 so as to maintain the elongate handle 36 in a generally upright orientation when the pair of cages 12, 14 is in the first position (P1) and the device 10 is resting about the opening on a ground surface. In this manner, when the device 10 is not in use, the handle 36 maintains a generally upright orientation.

In operation, the device 10 is placed above a fish "F", such as is illustrated in FIG. 1. The device 10 is then translated downwardly such that the opening 16 is positioned aligned with the fish "F" and then around the fish "F" and against a ground surface as illustrated in FIG. 2. Elongate handle 36 is then rotated in order to unlatch the latch bar 40. The tensioner 24 is then pulled or otherwise engaged until the cage members 12, 14 pivot downwardly and into each other to form an enclosure as illustrated in FIG. 3. The fish "F" is then released by grasping supports 46, 48 such that the cage members 12, 14 are then pivoted outwardly from each other back into the first position (P1) as illustrated in FIG. 1. The fish is either deposited into a boat, cooler, or other containment system, or released back into the water. The elongate handle 36 is then rotated into the original position until bars 40 are in engagement with a bottom surface of the cage members 12, 14.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:
1. A fish capturing device comprising:
    a pair of cage members having a first position in which an opening is defined therebetween at a bottom facing portion thereof through which a fish may be passed through;
    a latch configured for latching the pair of cage members into the first position and selectively releasing the pair of cage members into a second position in which the opening is closed therebetween and the pair of cage members are nested to form an enclosure; and a tensioner for applying tension to the pair of cage members to bias the cage members into the second position to enclose the fish within the pair of cages members;

wherein the latch is carried by an elongated handle, wherein the elongate handle is configured to rotate the latch from a latched to an unlatched position, wherein the latch includes a rotatable bar that engages beneath a portion of each of the pair of cage members to maintain the cage members in the first position when the latch is in the latched position.

2. The device according to claim 1, further including a brace extending lengthwise with each of the pair of cage members and pivotally carrying each cage member.

3. The device according to claim 1, wherein the cage members have netting carried thereabout for forming the enclosure, and, wherein the opening is free of netting.

4. The device according to claim 3, wherein a length of the pair of cage members is less than a length of the other of the pair of cage members such that the shorter cage member can be received within the longer cage member when the pair of cage members are in the second position.

5. The device according to claim 1, wherein the tensioner includes one of a rope, string, and cable, and further wherein, pulling upwards on the tensioner at a portion proximal the elongate handle biases the cages into the second position.

6. The device according to claim 1, wherein each of the pair of cage members includes a support extending therefrom, each of the supports surrounding the handle and being pivoted when the pair of cage members moves between the first and second positions.

7. The device according to claim 6, wherein the supports can be grabbed and pivoted until in parallel alignment to impart movement of the pair of cage members into the first position.

8. The device according to claim 7, wherein the supports surround the elongate handle so as to maintain the elongate handle in a generally upright orientation when the pair of cage members is in the first position and the device is resting about the opening on a ground surface.

9. A fish capturing device comprising:
a pair of cage members having a first position in which an opening is defined therebetween through which a fish may be passed and a second position in which each of the cage members are pivoted until the cage members are nested together to form an enclosure for enclosing a fish therein;
a latch configured for latching the pair of cage members into the first position and releasing the pair of cage members into the second position; and
a tensioner for applying tension to the pair of cage members to bias the cage members into the second position to enclose the fish within the pair of cage members;
wherein the latch is carried by an elongate handle, wherein the elongate handle is configured to rotate the latch from a latched to an unlatched position, wherein the latch includes a rotatable bar that engages beneath a portion of each of the pair of cage members to maintain the cage members in the first position when the latch is in the latched position.

10. The device according to claim 9, further including a brace extending lengthwise with each of the pair of cage members and pivotally carrying each cage member.

11. The device according to claim 9, wherein the cage members have netting carried thereabout for forming the enclosure.

12. The device according to claim 11,
wherein a length of one of the pair of cage members is less than a length of the other of the pair of cage members such that the shorter cage member can be received within the longer cage member when the pair of cage members are in the second position.

13. The device according to claim 9, wherein the tensioner includes one of a rope, string, and cable, and further wherein, pulling upwards on the tensioner at a portion proximal the elongate handle biases the cages into the second position.

14. The device according to claim 9, wherein each of the pair of cage members includes a support extending therefrom, the support surrounding the handle and being pivoted when the pair of cage members move between the first and second positions, and the supports can be grabbed and pivoted until in parallel alignment to impart movement of the pair of cages into the first position.

15. A method comprising:
providing a fish capturing device that includes:
a pair of cage members having a first position in which an opening is defined therebetween at a bottom facing portion thereof through which a fish may be passed through;
a latch configured for latching the pair of cage members into the first position and selectively releasing the pair of cage members so that they are translatable into a second position in which the opening is closed therebetween and the pair of cage members are nested to form an enclosure;
wherein the latch is carried by an elongate handle, wherein the elongate handle is configured to rotate the latch from a latched to an unlatched position, wherein the latch includes a rotatable bar that engages beneath a portion of each of the pair of cage members to maintain the cage members in the first position when the latch is in the latched position; and
a tensioner for applying tension to the pair of cage members to bias the cage members into the second position to enclose the fish within the pair of cage members;
positioning the opening above a fish to capture;
translating the device downwardly until the fish is within the opening;
rotating the latch so that the pair of cage members are translatable into a second position;
applying tension with the tensioner until the pair of cage members are in the second position and nested to form an enclosure in which the fish is captured.

\* \* \* \* \*